US010281811B2

(12) United States Patent
Wang et al.

(10) Patent No.: US 10,281,811 B2
(45) Date of Patent: May 7, 2019

(54) LIGHT SOURCE MODULE FOR ADJUSTING BLUE BEAM AND PROJECTION APPARATUS USING THE SAME

(71) Applicant: Coretronic Corporation, Hsin-Chu (TW)

(72) Inventors: Chi-Hsun Wang, Hsin-Chu (TW); Chang-Hsuan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/841,307

(22) Filed: Dec. 14, 2017

(65) Prior Publication Data

US 2018/0164667 A1   Jun. 14, 2018

(30) Foreign Application Priority Data

Dec. 14, 2016   (CN) .......................... 2016 1 1151018

(51) Int. Cl.
*G03B 21/20*   (2006.01)
*G02B 26/00*   (2006.01)

(52) U.S. Cl.
CPC .......... *G03B 21/204* (2013.01); *G02B 26/00* (2013.01); *G02B 26/008* (2013.01); *G03B 21/20* (2013.01); *G03B 21/2013* (2013.01); *G03B 21/2066* (2013.01); *G03B 21/2073* (2013.01)

(58) Field of Classification Search
CPC .............. G03B 21/204; G03B 21/2013; G03B 21/2066; G02B 26/008
See application file for complete search history.

(56) References Cited

U.S. PATENT DOCUMENTS

2015/0146406 A1*   5/2015   Chang ....................... F21V 9/08
                                                                362/84
2017/0315430 A1*  11/2017   Wang ................... G02B 26/008

FOREIGN PATENT DOCUMENTS

CN   102645830   7/2015
TW   201512762   4/2015
TW   I504832   10/2015

* cited by examiner

*Primary Examiner* — Sultan Chowdhury
*Assistant Examiner* — Magda Cruz
(74) *Attorney, Agent, or Firm* — JCIPRNET

(57) ABSTRACT

A light source module including a blue laser light source, an adjusting light source, a wavelength conversion device, and a light combiner is provided. The wavelength conversion device is disposed on an optical path of a first blue beam provided by the blue laser light source and an optical path of an adjusting beam provided by the adjusting light source. When a first transmissive area of the wavelength conversion device is cut into the optical path of the first blue beam, the blue laser light source and the adjusting light source are simultaneously turned on. A transmission direction of the first blue beam passing through the first transmissive area is opposite to a transmission direction of the adjusting beam passing through the first transmissive area. The light combiner combines the first blue beam and the adjusting beam into a second blue beam. Moreover, a projection apparatus is provided. The light source module and the projection apparatus in the invention may adjust a blue beam complied with a wider color gamut specification, and is easy to achieve an image with wider color gamut.

18 Claims, 6 Drawing Sheets

LIGHT SOURCE MODULE FOR ADJUSTING BLUE BEAM AND PROJECTION APPARATUS USING THE SAME

CROSS-REFERENCE TO RELATED APPLICATION

This application claims the priority benefit of China application serial no. 201611151018.7, filed on Dec. 14, 2016. The entirety of the above-mentioned patent application is hereby incorporated by reference herein and made a part of this specification.

BACKGROUND OF THE INVENTION

Field of the Invention

The invention relates to an optical module and a display apparatus, and particularly relates to a light source module and a projection apparatus.

Description of Related Art

In recent years, projection apparatus that takes a laser diode as a solid state light source gradually occupies a place in the market. Besides capable of using a laser light emitted by a laser light source to excite a fluorescent powder to produce an excited light, the laser projection apparatus may also directly take the laser light as an illumination light source of the projection apparatus. In a structure of a general projection apparatus, a blue laser light excites the fluorescent powder adapted to convert the laser light into a green beam or a yellow beam on a fluorescence color wheel to produce the green beam or the yellow beam. The green beam passes through a green filter on a filter color wheel to produce a green beam meeting the requirement. A part of the yellow beam passes through a red filter to form a red beam, and a part of the yellow beam passes through a transparent area on the filter color wheel to form a yellow beam. Moreover, the blue beam passes through a hollow portion or a transparent area on the fluorescence color wheel and passes through the transparent area on the filter color wheel to form a blue beam.

Generally, in high definition television (HDTV) standard specifications specified by an international telecommunication union (ITU), Rec.709 is a basic image standard specification, which represents a standard color gamut. Requirement of a color gamut of DCI-P3 is wider, and color purity thereof is higher, and the current high class displays all take the color gamut of DCI-P3 as a color gamut target. A color gamut range of the projection apparatus is generally defined by coordinate points of the aforementioned blue beam, the green beam and the red beam in a CIE 1931 color space chroma diagram. The CIE 1931 color space is a color space defined by International Commission on Illumination (CIE) in 1931 by using a mathematical method. By comparing whether the color gamut range of the projection apparatus covers an area range of the specific standard color gamut in the CIE 1931 color space chroma diagram, it is learned whether a color presented by an image of the projection apparatus is complied with a specific color gamut specification. Conventionally, adjustment of the color space may adopt a Hue saturation and gain (HSG) adjustment method, where the Hue is different colors sensed by human eyes under illumination of lights of different wavelengths. Saturation refers to a purity of a color, and the higher the saturation is, the purer the color is, and the lower the saturation is, the more the color becomes gray. Gain refers to a brightness of a color. Therefore, color performance of a red color, a green color, a blue color, a yellow color, a blue green color and a magenta color projected by the projection apparatus are adjusted according to the HSG method.

The standard color gamut of a commonly used display or a projection apparatus is, for example, the Rec.709 standard color gamut or the DCI-P3 standard color gamut. However, a coordinate point of a blue beam provided by a commonly used blue laser light source of the projection apparatus in the CIE 1931 color space chroma diagram is slightly different to the coordinate point of the blue beam of the aforementioned commonly used standard color gamut specification. When a user views a blue image projected by such type of the projection apparatus, the user may feel that the image presents a slight blue purple color, which is not a standard blue color.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a light source module and a projection apparatus, which are adapted to adjust a blue beam complied with a wider color gamut specification, and is easy to adjust an optical property of the adjusted blue beam, so as to satisfy different optical applications.

Other objects and advantages of the invention may be further illustrated by the technical features broadly embodied and described as follows.

In order to achieve one or a portion of or all of the objects or other objects, an embodiment of the invention provides a light source module adapted to provide an illumination beam. The light source module includes a blue laser light source, an adjusting light source, a wavelength conversion device, and a light combiner. The blue laser light source is adapted to provide a first blue beam, and the adjusting light source is adapted to provide an adjusting beam. The wavelength conversion device is disposed on an optical path of the first blue beam and an optical path of the adjusting beam. The wavelength conversion device has at least one wavelength conversion area and at least one first transmissive area. The at least one wavelength conversion area and the at least one first transmissive area are cut into the optical path of the first blue beam by turns, and the at least one wavelength conversion area is adapted to convert the first blue beam to generate a conversion beam. When the at least one first transmissive area is cut into the optical path of the first blue beam, the blue laser light source and the adjusting light source are simultaneously turned on. The first blue beam and the adjusting beam pass through the at least one first transmissive area, and a transmission direction of the first blue beam passing through the at least one first transmissive area is opposite to a transmission direction of the adjusting beam passing through the at least one first transmissive area. The light combiner is disposed on the optical path of the first blue beam and the optical path of the adjusting beam, and is adapted to combine the first blue beam coming from the at least one first transmissive area and the adjusting beam coming from the at least one first transmissive area into a second blue beam.

In order to achieve one or a portion of or all of the objects or other objects, an embodiment of the invention provides a projection apparatus including a light source module, an imaging device, and a projection lens. The light source module is adapted to provide an illumination beam. The light source module includes a blue laser light source, an adjusting light source, a wavelength conversion device, and a light combiner. The blue laser light source is adapted to provide a first blue beam, and the adjusting light source is adapted to provide an adjusting beam. The wavelength conversion device is disposed on an optical path of the first blue beam and an optical path of the adjusting beam. The wavelength conversion device has at least one wavelength conversion area and at least one first transmissive area. The at least one wavelength conversion area and the at least one first transmissive area are cut into the optical path of the first blue beam by turns, and the at least one wavelength conversion area is adapted to convert the first blue beam to generate a conversion beam. When the at least one first transmissive area is cut into the optical path of the first blue beam, the blue laser light source and the adjusting light source are simultaneously turned on. The first blue beam and the adjusting beam pass though the at least one first transmissive area, and a transmission direction of the first blue beam passing through the at least one first transmissive area is opposite to a transmission direction of the adjusting beam passing through the at least one first transmissive area. The light combiner is disposed on the optical path of the first blue beam and the optical path of the adjusting beam, and is adapted to combine the first blue beam coming from the at least one first transmissive area and the adjusting beam coming from the at least one first transmissive area into a second blue beam. The imaging device is disposed on an optical path of the illumination beam, and is adapted to convert the illumination beam into an image beam. The projection lens is disposed on an optical path of the image beam, and is adapted to project the image beam to a projection target.

According to the above description, the embodiments of the invention have at least one of the following advantages and effects. In the light source module and the projection apparatus of the embodiment of the invention, when the at least one first transmissive area of the wavelength conversion device is cut into the optical path of the first blue beam, the blue laser light source and the adjusting light source are simultaneously turned on, such that the first blue beam and the adjusting beam pass through the at least one first transmissive area all together, and the transmission direction of the first blue beam passing through the at least one first transmissive area is opposite to the transmission direction of the adjusting beam passing through the at least one first transmissive area. Moreover, the light combiner is adapted to combine the first blue beam coming from the at least one transmissive area and the adjusting beam coming from the at least one transmissive area into the second blue beam. Therefore, the light source module and the projection apparatus may perform chroma adjustment to the first blue beam provided by the blue laser light source through the adjusting beam provided by the adjusting light source, so as to obtain the second blue beam complied with the wide color gamut specification, and by combining the first blue beam and the adjusting beam, the projection apparatus may project a blue image with a higher brightness. Moreover, since the first blue beam and the adjusting beam all pass through the at least one first transmissive area, the first blue beam and the adjusting beam may be optically adjusted through the at least one first transmissive area, such that the optical property of the second blue beam is easy to be adjusted to satisfy different optical applications.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

Figure 1A:
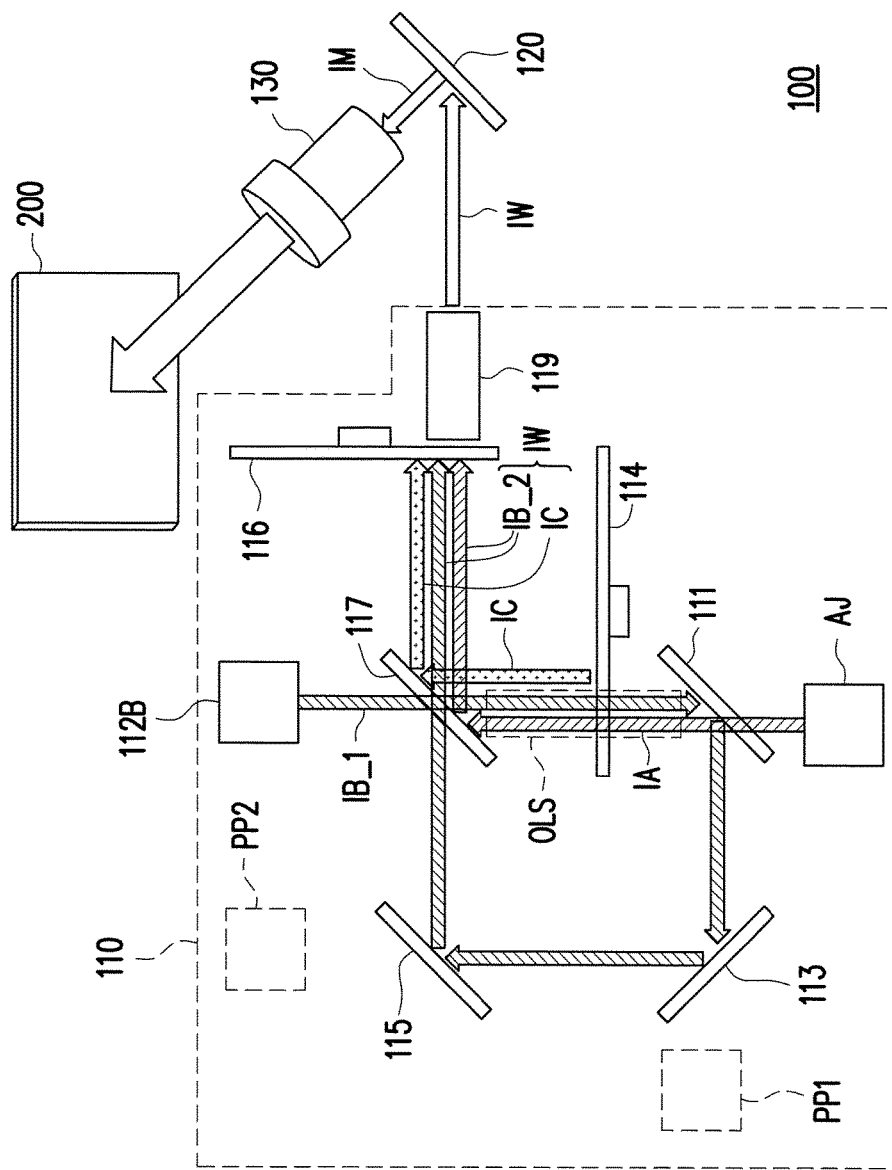
FIG. 1A is a schematic diagram of a projection apparatus according to an embodiment of the invention.

FIG. 1A is a schematic diagram of a projection apparatus according to an embodiment of the invention. Referring to FIG. 1A, in the embodiment, the projection apparatus 100 includes a light source module 110, an imaging device 120 and a projection lens 130. The light source module 110 is adapted to provide an illumination beam IW to serve as a beam for projecting an image. The imaging device 120 is disposed on an optical path of the illumination beam IW, and the imaging device 120 is adapted to convert the illumination beam IW into an image beam IM. The projection lens 130 is disposed on an optical path of the image beam IM, and the projection lens 130 is adapted to project the image beam IM to a projection target 200, for example, a screen or a wall.

In the embodiment, the imaging device 120 is adapted to convert the illumination beam IW coming from the light source module 110 into the image beam IM. To be specific, the imaging device 120 is, for example, a reflective optical modulator such as a liquid crystal on silicon panel (LCoS panel), a digital micro-mirror device (DMD), etc. In an embodiment, the imaging device 120 is, for example, a transmissive optical modulator such as a transparent liquid crystal panel, an electro-optical modulator, a magneto-optic modulator, an acousto-optic modulator (AOM), etc. The pattern and the type of the imaging device 120 are not limited by the invention. In the embodiment, regarding the method for converting the illumination beam IW into the image beam IM by the imaging device 120, those skilled in the art may learn enough instructions and recommendations for detailed steps and implantation of the method from common knowledge of the technical field, so that detail thereof is not repeated.

In the embodiment, the projection lens 130 is, for example, a combination of one or a plurality of optical lenses with refractive powers, for example, includes various combinations of non-planar lenses such as a biconcave lens, a biconvex lens, a concave-convex lens, a convex-concave lens, a plano-convex lens, and a plano-concave lens. In an embodiment, the projection lens 130 may also include a planar optical lens to project the image beam IM coming from the imaging device 120 to the projection target 200 in a reflective or transmissive manner. The pattern and the type of the projection lens 130 are not limited by the invention.

Figure 1B:
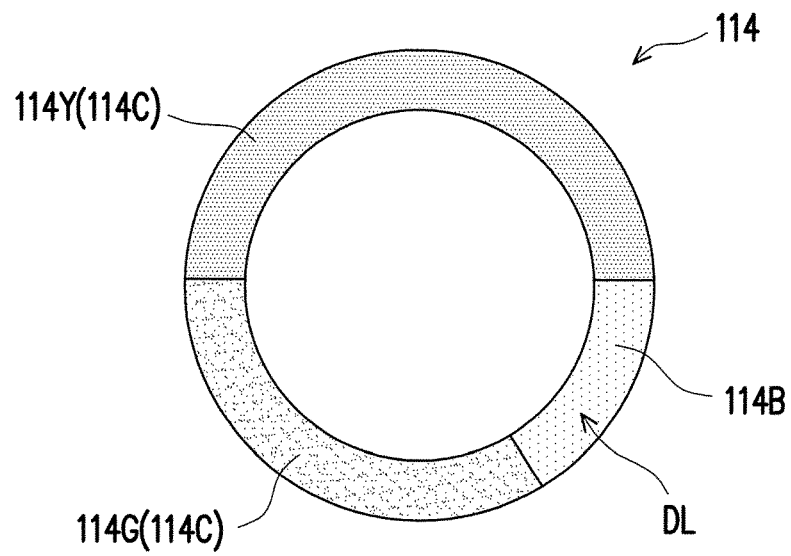
FIG. 1B is a schematic diagram of a wavelength conversion device according to the embodiment of FIG. 1A.

FIG. 1B is a schematic diagram of a wavelength conversion device according to the embodiment of FIG. 1A. Referring to FIG. 1A and FIG. 1B, in the embodiment, the light source module 110 includes a blue laser light source 112B, an adjusting light source AJ, a wavelength conversion device 114, a filter device 116, a wavelength selection element 111, a plurality of reflecting elements 113, 115, a light combiner 117 and a light integration rod 119. The blue laser light source 112B is adapted to provide a first blue beam IB_1, and the adjusting light source AJ is adapted to provide an adjusting beam IA. To be specific, the wavelength conversion device 114 is disposed on an optical path of the first blue beam IB_1 and an optical path of the adjusting light IA. The wavelength conversion device 114 is, for example, a wavelength conversion wheel, for example, a phosphor wheel or a fluorescence wheel that is capable of converting a wavelength of the first blue beam IB_1 into a different wavelength, though the invention is not limited thereto.

In the embodiment, the wavelength conversion device 114 has at least one wavelength conversion area 114C and at least one first transmissive area 114B (shown in FIG. 1B), and the at least one wavelength conversion area 114C and the at least one first transmissive area 114B are cut into the optical path of the first blue beam IB_1 by turns. In detail, the wavelength conversion device 114 is adapted to rotate along a rotation axis (not shown), such that the at least one wavelength conversion area 114C and the at least one first transmissive area 114B are cut into the optical path of the first blue beam IB_1 by turns. The at least one first transmissive area 114B is pervious to the first blue beam IB_1, and the at least one wavelength conversion area 114C is adapted convert the first blue beam 1B_1 to generate a conversion beam IC. Through a metal reflective substrate (not shown) of the wavelength conversion device 114 or a reflection layer (not shown) coated on the substrate, the conversion beam IC is reflected towards the blue laser light source 112B. In the embodiment, the wavelength conversion device 114 is, for example, a fluorescence color wheel, and the at least one wavelength conversion area 114C includes a fluorescent powder, and the fluorescent powder is coated on the at least one wavelength conversion area 114C to face the blue laser light source 112B. To be specific, the at least one wavelength conversion area 114C includes a wavelength conversion area 114G and a wavelength conversion area 114Y. The fluorescent powder coated on the wavelength conversion area 114G is, for example, adapted to convert the first blue beam IB_1 into a green beam, and the fluorescent powder coated on the wavelength conversion area 114Y is, for example, adapted to convert the first blue beam IB_1 into a yellow beam. Moreover, a color of the conversion beam IC corresponds to a color of the beam excited from the fluorescent powder, for example, green color or a yellow color. However, in other embodiments, the at least one wavelength conversion area 114C may also be coated with a fluorescent powder adapted to convert the first blue beam IB_1 to produce other color beam, and the color of the conversion beam IC may correspond to the color of the beam excited from the fluorescent powder, which is not limited by the invention.

In the embodiment, the at least one first transmissive area 114B is also pervious to the adjusting beam IA coming from the adjusting light source AJ. When the at least one first transmissive area 114B is cut into the optical path of the first blue beam 1B_1, the at least one first transmissive area 114B is simultaneously cut into the optical path of the adjusting beam IA. Now, the blue laser light source 112B and the adjusting light source AJ are simultaneously turned on, such that the first blue beam IB_1 and the adjusting beam IA pass through the at least one first transmissive area 114B. Moreover, a transmission direction of the first blue beam IB_1 passing through the at least one first transmissive area 114B is opposite to a transmission direction of the adjusting beam IA passing through the at least one first transmissive area 114B. To be specific, the wavelength conversion device 114 is, for example, located between the blue laser light source 112B and the adjusting light source AJ. The optical path of the first blue beam IB_1 and the optical path of the adjusting beam IA have an overlapped section OLS, and the wavelength conversion device 114 is located in the overlapped section OLS. To be specific, in the overlapped section OLS, the transmission direction of the first blue beam IB_1 is opposite to the transmission direction of the adjusting beam IA.

In the embodiment, the at least one first transmissive area 114B further includes a light diffusion layer DL, and the light diffusion layer DL on the at least one first transmissive area 114B is adapted to cut into the optical path of the first blue beam IB_1. To be specific, the at least one first transmissive area 114B is, for example, adapted with a diffusion plate, and the light diffusion layer DL is disposed on the diffusion plate. Regarding the first blue beam IB_1 and the adjusting beam IA passing through the light diffusion layer DL, beam shapes thereof may be adjusted by the light diffusion layer DL, or speckles formed on the projection target 200 by projecting the first blue beam IB_1 and the adjusting beam IA to the projection target 200 are eliminated. In some embodiments, the at least one first transmissive area 114B is, for example, a hole formed on the wavelength conversion device 114 or is a transparent plate, so as to reduce energy loss of the first blue beam IB_1 and the adjusting beam IA, and the invention is not limited thereto.

Referring to FIG. 1A, in the embodiment, the wavelength selection element 111 is disposed between the adjusting light source AJ and the wavelength conversion device 114 and is located on the optical path of the first blue beam IB_1 and the optical path of the adjusting beam IA. The wavelength selection element 111 is pervious to the adjusting beam IA, and is adapted to reflect the first blue beam IB_1. When the at least one first transmissive area 114B of the wavelength conversion device 114 is cut into the optical path of the first blue beam IB_1, the adjusting beam IA sequentially passes through the wavelength selection element 111 and the at least one first transmissive area 114B. Moreover, the reflecting elements 113 and 115 are disposed on the optical path of the first blue beam 1B_1 passing through the at least one first transmissive area 114B, and are adapted to change the transmission direction of the first blue beam IB_1. The light combiner 117 is disposed on the optical path of the first blue beam IB_1 and the optical path of the adjusting beam IA, and is adapted to combine the first blue beam IB_1 coming from the at least one transmissive area 114B and the reflecting elements 113 and 115 with the adjusting beam IA coming from the at least one transmissive area 114B into a second blue beam IB_2. In detail, the light combiner 117 is also disposed on the optical path of the conversion beam IC. The light combiner 117 is adapted to combine the conversion beam IC and the second blue beam IB_2, and the conversion beam IC and the second blue beam IB_2 are a part of the illumination beam IW. Moreover, the overlapped section OLS of the optical path of the first blue beam IB_1 and the optical path of the adjusting beam IA is a section between the light combiner 117 and the wavelength selection element 111.

In the embodiment, the wavelength selection element 111 and the light combiner 117 are, for example, dichroic members, which are adapted to reflect a beam of a specific waveband and pervious to beams of the other wavebands, or pervious to beams of the specific waveband and reflect beams of the other wavebands. In the embodiment, wavebands of the first blue beam IB_1 and the adjusting beam IA are different to each other, and wavebands of the adjusting beam IA and the conversion beam IC are different to each other or partially overlapped to each other. The wavelength selection element 111 may, for example, reflect the first blue beam IB_1 and is pervious to the adjusting beam IA, and the light combiner 117 may, for example, reflect the adjusting beam IA and the conversion beam IC and pervious to the first blue beam IB_1. To be specific, when the at least one first transmissive area 114B of the wavelength conversion device 114 is cut into the optical path of the first blue beam 1B_1, the first blue beam IB_1 emitted by the blue laser light source 112B sequentially penetrates through the light combiner 117 and the at least one first transmissive area 114B of the wavelength conversion device 114, and is sequentially reflected by the wavelength selection element 111, the reflecting element 113 and the reflecting element 115 to the light combiner 117, and passes through the light combiner 117. Moreover, the adjusting beam IA emitted by the adjusting light source AJ sequentially passes through the wavelength selection element 111 and the at least one first transmissive area 114B of the wavelength conversion device 114, and is reflected by the light combiner 117. When the at least one wavelength conversion area 114C of the wavelength conversion device 114 is cut into the optical path of the first blue beam IB_1, the first blue beam IB_1 emitted by the blue laser light source 112B penetrates through the light combiner 117 and is transmitted to the at least one wavelength conversion area 114C, and the first blue beam IB_1 is converted into the conversion beam IC. The conversion beam IC is reflected back to the light combiner 117 by the at least one wavelength conversion area 114C, and is further reflected by the light combiner 117. In other embodiments, the wavebands of the first blue beam IB_1 and the adjusting beam IA may be partially overlapped, and the wavelength selection element 111 may, for example, reflect the first blue beam 1B_1 and is pervious to a part of the adjusting beam 1A with a waveband non-overlapped with the waveband of the first blue beam 1B_1. The light combiner 117 may, for example, reflect the conversion beam IC and reflect the adjusting beam IA passing through the wavelength selection element 111, and is pervious to the first blue beam IB_1, though the invention is not limited thereto.

Figure 1C:
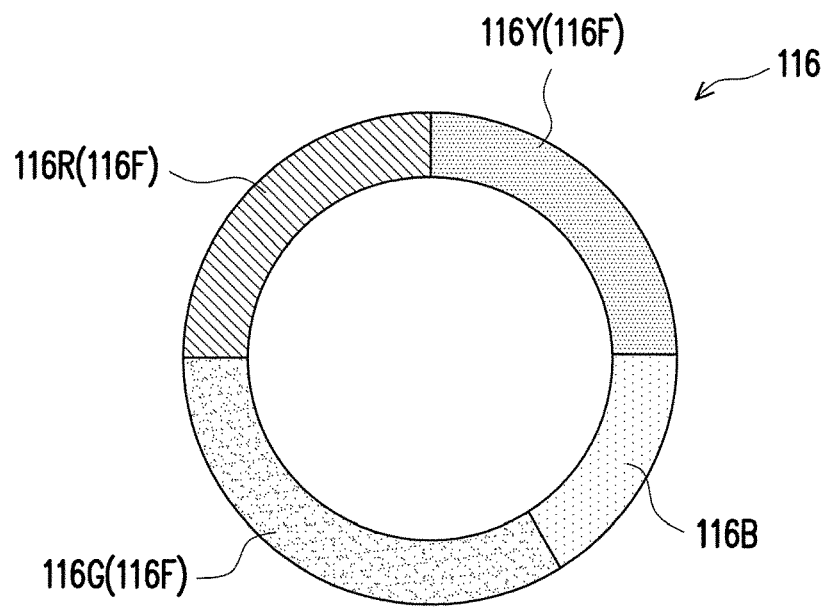
FIG. 1C is a schematic diagram of a filter device according to the embodiment of FIG. 1A.

FIG. 1C is a schematic diagram of a filter device according to the embodiment of FIG. 1A. Referring to FIG. 1A and FIG. 1C, in the embodiment, the filter device 116 is disposed on the optical path of the illumination beam IW. To be specific, the filter device 116 is located between the light combiner 117 and the light integration rod 119, and the second blue beam IB_2 and the conversion beam IC are combined by the light combiner 117 and transmitted backward to the filter device 116. The filter device 116 has at least one filter area 116F and at least one second transmissive area 116B (shown in FIG. 1C), and the at least one filter area 116F and the at least one second transmissive area 116B are cut into the optical path of the illumination beam IW by turns. In detail, the filter device 116 is, for example, a filter color wheel, which is adapted to rotate, such that the at least one filter area 116F and the at least one second transmissive area 116B are cut into the optical path of the illumination beam IW by turns, and the at least one filter area 116F and the at least one second transmissive area 116B are adapted to be pervious to beams of different colors.

Referring to FIG. 1B and FIG. 1C, to be specific, the wavelength conversion device 114 and the filter device 116 are, for example, rotated in a same rotation speed. The at least one filter area 116F of the filter device 116 corresponds to the at least one wavelength conversion area 114C of the wavelength conversion device 114, and the at least one second transmissive area 116B of the filter device 116 corresponds to the at least one first transmissive area 114B of the wavelength conversion device 114, i.e. when the at least one wavelength conversion area 114C is cut into the optical path of the first blue beam IB_1, the at least one filter area 116F is correspondingly cut into the optical path of the illumination beam IW, and when the at least one first transmissive area 114B is cut into the optical path of the first blue beam IB_1, the at least one second transmissive area 116B is correspondingly cut into the optical path of the illumination beam IW. In detail, the at least one filter area 116F includes a filter area 116G, a filter area 116R and a filter area 116Y. The wavelength conversion area 114G corresponds to the filter area 116G, and the filter area 116G is, for example, adapted with a green light filter and is pervious to a green beam coming from the wavelength conversion area 114G. The wavelength conversion area 114Y corresponds to the filter area 116R and the filter area 116Y. The filter area 116R is, for example, adapted with a red light filter and is adapted to filter out a red beam from a part of yellow light coming from the wavelength conversion area 114Y, and the filter area 116Y is, for example, adapted with a yellow light filter or is a transparent area and is pervious to another part of the yellow beam coming from the wavelength conversion area 114Y. Moreover, the at least one first transmissive area 114B corresponds to the at least one second transmissive area 116B, and the at least one second transmissive area 116B is, for example, pervious to the second blue beam IB_2. In the embodiment, the at least one second transmissive area 116B, for example, includes a light diffusion layer, and a beam shape of the second blue beam IB_2 passing through the light diffusion layer is adjusted, or a speckle formed on the projection target 200 by projecting the second blue beam IB_2 to the projection target 200 is eliminated, though the invention is not limited thereto. In some embodiments, the at least one second transmissive area 116B is, for example, a hole formed on the filter device 116 or is a transparent plate, which is not limited by the invention.

Referring to FIG. 1A, the light integration rod 119 is disposed on the optical path between the filter device 116 and the imaging device 120, and is adapted to uniform the illumination beam IW, such that the illumination beam IW may be uniformly and accurately output by the light source module 110, so as to avoid a problem of uneven brightness of the projection apparatus 100 on the optical path. In the embodiment, the light integration rod 119 receives the second blue beam IB_2, a green beam, a yellow beam and a red beam coming from the filter device 116, and uniforms the aforementioned beams, and the invention is not limited to the colors of the aforementioned beams.

Moreover, in the embodiment, the blue laser light source 112B used by the light source module 110 is, for example, a laser diode (LD) light source, which is, for example, a blue laser diode bank. Moreover, the adjusting beam IA emitted by the adjusting light source AJ is, for example, a green beam or a blue beam, and the wavebands of the first blue beam IB_1 and the adjusting beam IA are different to each other or partially overlapped to each other. For example, the adjusting beam IA is, for example, a green beam with a wavelength range of about 520 nanometer (nm). The adjusting beam AJ is, for example, a laser diode light source, a light emitting diode (LED or an organic light emitting diode (OLED), which is not limited by the invention. Moreover, in the embodiment, the quantity and setting positions of the wavelength selection element 111, the reflecting element 113, the reflecting element 115, the light combiner 117 and the light integration rod 119 are only an example, and the invention is not limited thereto, and the quantity and the setting positions thereof may be adjusted according to a different optical structure of the light source module 110.

Figure 2A:
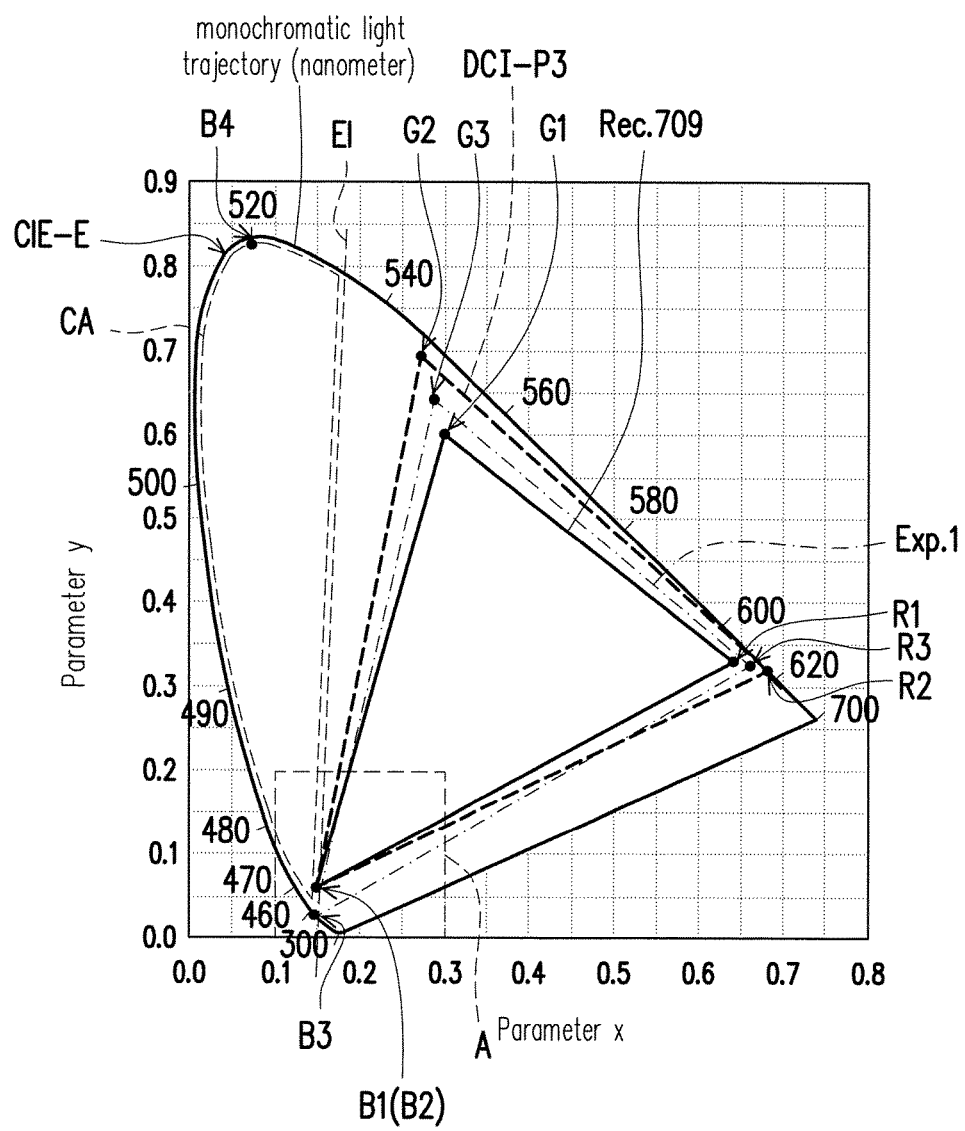
FIG. 2A is a CIE 1931 color space chroma diagram.
Figure 2B:
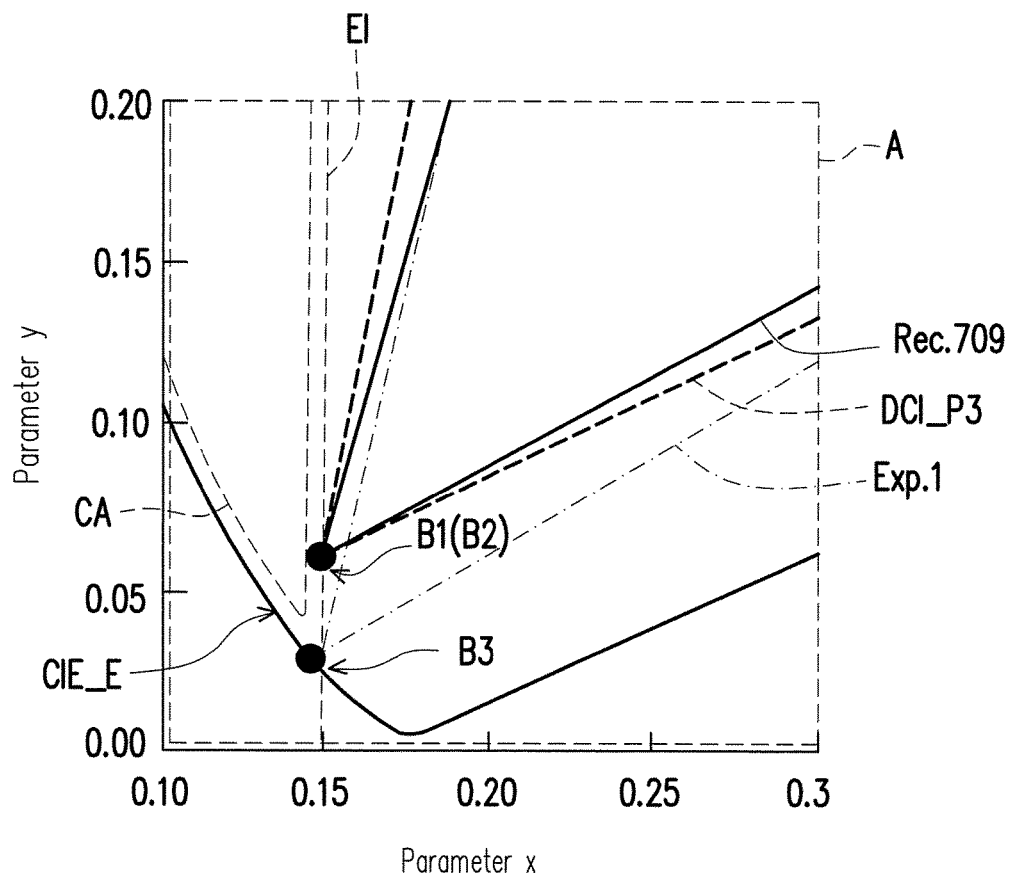
FIG. 2B is an enlarged view of an area A of FIG. 2A.

FIG. 2A is a CIE 1931 color space chroma diagram, and FIG. 2B is an enlarged view of an area A of FIG. 2A. Referring to FIG. 2A and FIG. 2B, FIG. 2A illustrates an area defined by a Rec.709 standard color gamut and an area defined by a DCI-P3 standard color gamut in the CIE 1931 color space chroma diagram. The CIE 1931 color space is a color space defined by International Commission on Illumination (CIE) in 1931 by using a mathematical method. "Parameter x" of a horizontal axis and "parameter y" of a vertical axis in FIG. 2A and FIG. 2B are used for defining color chroma in form of coordinates. In FIG. 2A, a coordinate point on a "monochromatic light trajectory" represents a coordinate point corresponding to a chroma performance of a monochromatic light with a specific wavelength, where a unit of the wavelength is nanometer (nm), and an edge CIE_E of the "monochromatic light trajectory" encircles an area range in the CIE 1931 color space chroma diagram. For example, a point 520 on the "monochromatic light trajectory" of FIG. 2A represents a coordinate point corresponding to a chroma performance of a monochromatic light with a wavelength of 520 nm. Moreover, in FIG. 2A and FIG. 2B, an area of "Rec.709" in the CIE 1931 color space chroma diagram represents the area defined by the Rec.709 standard color gamut. A coordinate point R1, a coordinate point G1 and a coordinate point B1 respectively represent a red coordinate point (0.64, 0.33), a green coordinate point (0.3, 0.6) and a blue coordinate point (0.15, 0.06) used for defining the Rec.709 standard color gamut. In FIG. 2A and FIG. 2B, an area of "DCI-P3" in the CIE 1931 color space chroma diagram represents the area defined by the DCI-P3 standard color gamut, and a coordinate point R2, a coordinate point G2 and a coordinate point B2 respectively represent a red coordinate point (0.68, 0.32), a green coordinate point (0.265, 0.69) and a blue coordinate point (0.15, 0.06) used for defining the DCI-P3 standard color gamut.

To be specific, in the CIE 1931 color space chroma diagram, the area defined by the DCI-P3 standard color gamut is greater than the area defined by the Rec.709 standard color gamut. It should be noted that the blue coordinate point (the coordinate point B1) complied with the Rec.709 standard color gamut and the blue coordinate point (the coordinate point B2) complied with the DCI-P3 standard color gamut are all located at the coordinate point (0.15, 0.06). Generally, a color performance and an optical performance of the image beam projected by the projection apparatus are properly designed to be in accordance with the Rec.709 standard color gamut and the DCI-P3 standard color gamut as far as possible according to a specification requirement thereof. However, a wavelength range of a blue beam emitted by a generally blue laser light source is within a range of 440 nm to 470 nm, and a coordinate point of the blue beam on the CIE 1931 color space chroma diagram is, for example, a coordinate point (0.1485, 0.0269). For example, a coordinate point B3 of the first blue beam IB_1 emitted by the blue laser light source 112B of FIG. 1A on the CIE 1931 color space chroma diagram is the coordinate point (0.1485, 0.0269).

When the blue coordinate point of the image beam projected by the projection apparatus falls on the coordinate point B3, regardless how the green coordinate point and the red coordinate point of the image beam are adjusted, the whole color gamut range of the image beam is hard to completely cover an area range defined by the Rec.709 standard color gamut or an area range defined by the DCI-P3 standard color gamut. For example, "Exp.1" in FIG. 2A and FIG. 2B is an area range of a color gamut of the image beam of the projection apparatus in the CIE 1931 color space chroma diagram according to a comparative embodiment. A coordinate point R3, a coordinate point G3 and a coordinate point B3 respectively represent a red coordinate point (0.6694, 0.3263), a green coordinate point (0.2901, 0.6261) and a blue coordinate point (0.1485, 0.0269) used for defining the color gamut range Exp.1 of the comparative embodiment. According to FIG. 2A and FIG. 2B, it is known that the color gamut range of the image beam of the comparative embodiment is designed for complying with the Rec.709 standard color gamut. However, since the blue coordinate point of the image beam is limited to the coordinate point B3, the color gamut range Exp.1 of the comparative embodiment is hard to completely cover the area range defined by the Rec.709 standard color gamut. To be specific, when a viewer views the blue image projected by the projection apparatus of the comparative embodiment, the user may feel the image presents a slight blue purple color, and is not a standard blue color.

In the embodiment, the second blue beam IB_2 is a part of the illumination beam IW, and the illumination beam IW is transmitted to the imaging device 120 from the light source module 110. Moreover, the second blue beam IB_2 is formed by combining the first blue beam IB_1 and the adjusting beam IA. Therefore, on the CIE 1931 color space chroma diagram, the coordinate point of the second blue beam IB_2 may be obtained by adjusting the coordinate point of the first blue beam IB_1 and the coordinate point of the adjusting beam IA, and the blue coordinate point of the illumination beam IW is, for example, determined by the coordinate point of the second blue beam IB_2. To be specific, the coordinate point of the first blue beam IB_1 is, for example, the coordinate point B3 of the color gamut range Exp.1 of the comparative embodiment of FIG. 2A, and the coordinate point of the second blue beam IB_2 is, for example, the coordinate point B1/B2 (shown in FIG. 2B) complied with the Rec.709 standard color gamut or the DCI-P3 standard color gamut. Moreover, the coordinate point of the adjusting beam IA in the CIE 1931 color space chroma diagram is a coordinate point B4 (shown in FIG. 2A).

In detail, in the CIE 1931 color space chroma diagram, the coordinate point B3 of the first blue beam IB_1 and the coordinate point B1/B2 of the second blue beam IB_2 construct an extension line EI, and in the CIE 1931 color space chroma diagram, an area encircled by the edge CIE_E of the "monochromatic light trajectory" and the extension line EI defines a closed area CA. In the embodiment, the coordinate point B4 of the adjusting beam IA is located in the closed area CA, and a Y-axis (i.e. the vertical axis of FIG. 2A and FIG. 2B) value of the coordinate point B4 of the adjusting beam IA is greater than a Y-axis value of the coordinate point B2 of the second blue beam IB_2. To be specific, an X-axis (i.e. the horizontal axis of FIG. 2A and FIG. 2B) value of the of the coordinate point B4 of the adjusting beam IA is smaller than 0.15, and the Y-axis value of the coordinate point B4 of the adjusting beam IA is greater than 0.06. For example, a wavelength of the adjusting beam IA is, for example, 520 nm, and the coordinate point B4 thereof is, for example, a coordinate point (0.074, 0.834). In the embodiment, by properly adjusting a light intensity of the first blue beam IB_1 and a light intensity of the adjusting beam IA, the position of the coordinate point B1/B2 of the second blue beam IB_2 in the CIE 1931 color space chroma diagram is adjusted, such that the blue coordinate point of the illumination beam IW (or the image beam IM) is complied with the blue coordinate point (the coordinate point B1) of the Rec.709 standard color gamut and the blue coordinate point (the coordinate point B2) of the DCI-P3 standard color gamut. When the viewer views the blue image projected by the projection apparatus 100 of the embodiment, the user may view a blue color complied with the aforementioned standards. Therefore, the projection apparatus 100 may tune out a blue light point complied with a wide color gamut specification, so as to implement a wide color gamut image frame. Besides, since the first blue beam IB_1 and the adjusting beam IA may simultaneously pass through the at least one first transmissive area 114B to implement optical adjustment, an optical property of the second blue beam IB_2 is easy to be adjusted to satisfy different optical applications.

Referring to FIG. 1A, in the related embodiments of the invention, the position of the adjusting light source AJ is, for example, a position PP1, a position PP2 or other position. To be specific, in the embodiment that the adjusting light source AJ is located at the position PP1, positions of the wavelength selection element 111 and the reflecting element 113 on the optical path of FIG. 1A may be exchanged, such that the adjusting beam IA may pass through the wavelength selection element 111 and is then reflected by the reflecting element 113 to pass through the at least one first transmissive area 114B of the wavelength conversion device 114. Moreover, in the embodiment that the adjusting light source AJ is located at the position PP2, positions of the wavelength selection element 111 and the reflecting element 115 on the optical path of FIG. 1A may be exchanged, such that the adjusting beam IA may pass through the wavelength selection element 111 and is then sequentially reflected by the reflecting element 113 and the reflecting element 115 to pass through the at least one first transmissive area 114B of the wavelength conversion device 114. In these embodiments, by combining the first blue beam IB_1 and the adjusting beam IA, the second blue beam IB_2 complied with the wide color gamut specification may be produced. In the related embodiments of the invention, actual positions of each of the optical devices of the projection apparatus 100 may be properly adjusted according to an actual requirement, which are not limited by the invention.

Figure 3A:
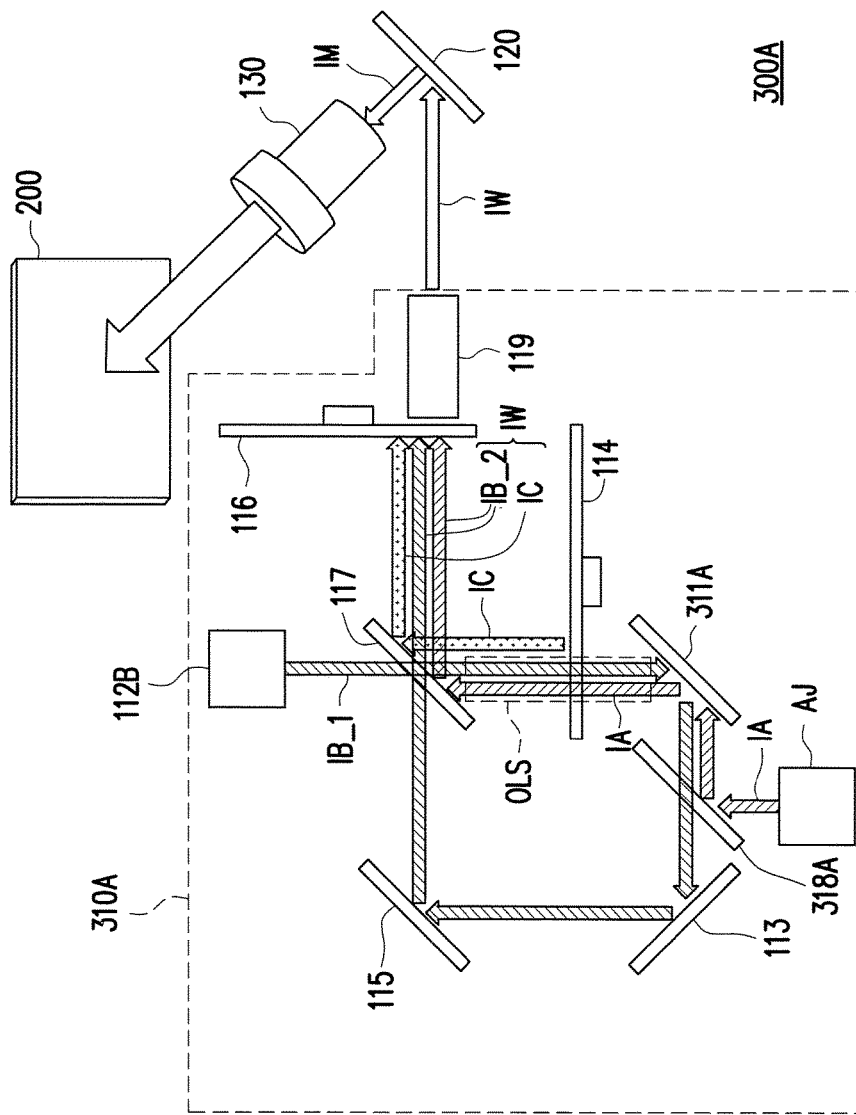
FIG. 3A and FIG. 3B are schematic diagrams of projection apparatuses according to other embodiments of the invention.
Figure 3B:
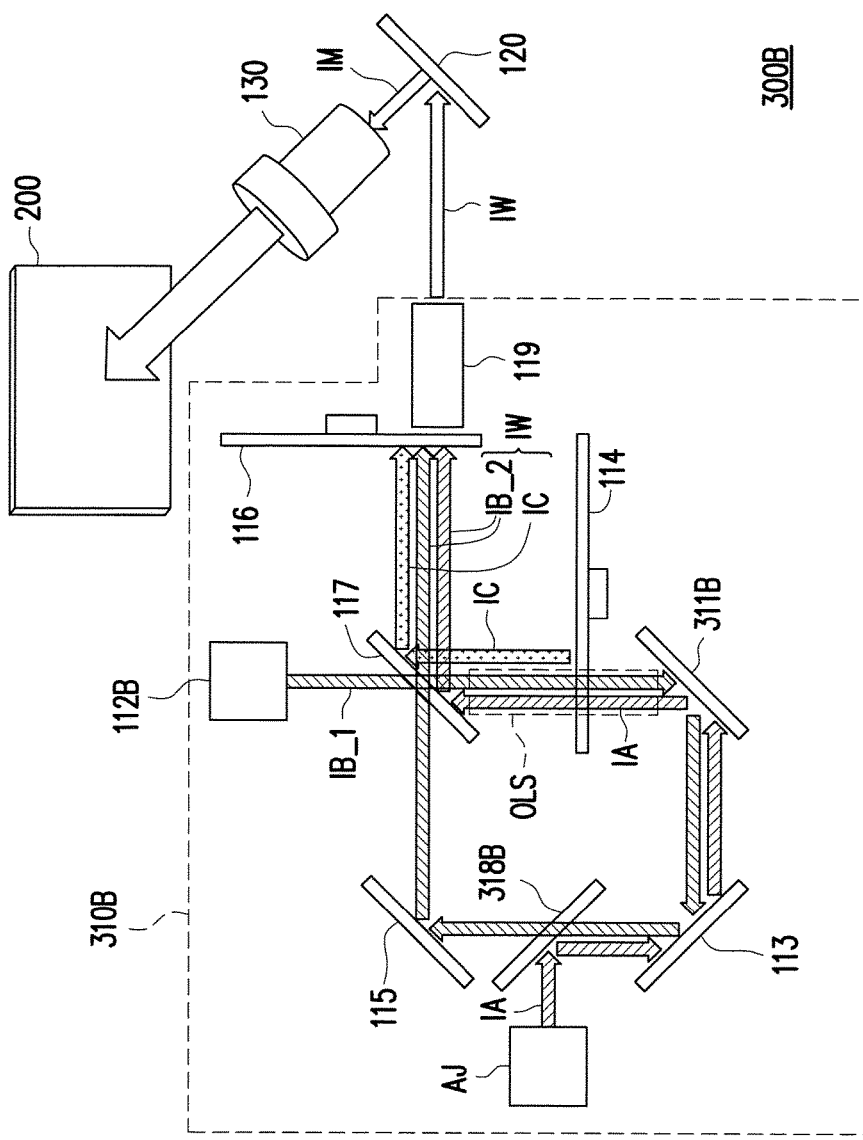

FIG. 3A and FIG. 3B are schematic diagrams of projection apparatuses according to other embodiments of the invention. Referring to FIG. 3A, the projection apparatus 300A is similar to the projection apparatus 100 of the embodiment of FIG. 1A. Components and related descriptions of the projection apparatus 300A may refer to related description of the projection apparatus 100 of the embodiment of FIG. 1A, and details thereof are not repeated. A difference between the projection apparatus 300A and the projection apparatus 100 is as follows. In the embodiment, the light source module 310A of the projection apparatus 300A further includes a wavelength selection element 318A disposed on the optical path of the first blue beam IB_1. In the embodiment, the wavebands of the first blue beam IB_1 and the adjusting beam IA are different to each other, and the wavelength selection element 318A is pervious to the first blue beam IB_1, and is adapted to reflect the adjusting beam IA. To be specific, the wavelength selection element 111 of the embodiment of FIG. 1A is replaced by a reflecting element 311A, and the wavelength selection element 318A is disposed between the reflecting element 113 and the reflecting element 311A. When the at least one transmissive area 114B of the wavelength conversion device 114 is cut into the optical path of the first blue beam 1B_1, the first blue beam IB_1 sequentially passes through the light combiner 117 and the at least one first transmissive area 114B, and is reflected by the reflecting element 311B, the reflecting element 113 to pass through the wavelength selection element 318B, and is then reflected back to the light combiner 117 by the reflecting element 115. Meanwhile, the adjusting beam IA is reflected by the wavelength selection element 318A and reflected by the reflecting element 311A, and passes through the at least one first transmissive area 114B for transmitting to the light combiner 117. In the embodiment, similar to the projection apparatus 100 of the embodiment of FIG. 1A, the first blue beam IB_1 and the adjusting beam IA of the projection apparatus 300A may be combined by the light combiner 117 to produce the second blue beam IB_2 complied with the wide color gamut specification. In other embodiments, the wavebands of the first blue beam IB_1 and the adjusting beam IA may be partially overlapped, and the wavelength selection element 318A is, for example, pervious to the first blue beam IB_1 and is adapted to reflect a part of the adjusting beam IA with a waveband non-overlapped to the waveband of the first blue beam IB_1.

Moreover, referring to FIG. 3B, the projection apparatus 300B is similar to the projection apparatus 300 of the embodiment of FIG. 3A. Components and related descriptions of the projection apparatus 300B may refer to related description of the projection apparatus 300A of the embodiment of FIG. 3A, and details thereof are not repeated. A difference between the projection apparatus 300B and the projection apparatus 300A is as follows. In the embodiment, the wavelength selection element 318B of the light source module 310B of the projection apparatus 300B is disposed between the reflecting element 115 and the reflecting element 113. When the at least one first transmissive area 114B of the wavelength conversion device 114 is cut into the optical path of the first blue beam IB_1, the first blue beam 1B_1 sequentially passes through the light combiner 117 and the at least one first transmissive area 114B, and is reflected by the reflecting element 311B and the reflecting element 113 to pass through the wavelength selection element 318B, and is then reflected back to the light combiner 117 by the reflecting element 115. Meanwhile, after the adjusting beam IA is reflected by the wavelength selection element 318B, the adjusting beam IA is sequentially reflected by the reflecting element 113 and the reflecting element 311B, and passes through the at least one first transmissive area 114B for transmitting to the light combiner 117. In the embodiment, similar to the projection apparatus 100 of the embodiment of FIG. 1A, the first blue beam IB_1 and the adjusting beam IA of the projection apparatus 300B may be combined by the light combiner 117 to produce the second blue beam IB_2 complied with the wide color gamut specification.

In summary, the embodiments of the invention have at least one of the following advantages and effects. In the light source module and the projection apparatus of the embodiment of the invention, when the at least one first transmissive area of the wavelength conversion device is cut into the optical path of the first blue beam, the blue laser light source and the adjusting light source are simultaneously turned on, such that the first blue beam and the adjusting beam pass through the at least one first transmissive area all together, and the transmission direction of the first blue beam passing through the at least one first transmissive area is opposite to the transmission direction of the adjusting beam passing through the at least one first transmissive area. Moreover, the light combiner is adapted to combine the first blue beam coming from the at least one transmissive area and the adjusting beam coming from the at least one transmissive area into the second blue beam. Therefore, the light source module and the projection apparatus may perform chroma adjustment to the first blue beam provided by the blue laser light source through the adjusting beam provided by the adjusting light source, so as to obtain the second blue beam complied with the wide color gamut specification, and by combining the first blue beam and the adjusting beam, the projection apparatus may project a blue image with a higher brightness. Moreover, since the first blue beam and the adjusting beam all pass through the at least one first transmissive area, the first blue beam and the adjusting beam may be optically adjusted through the at least one first transmissive area, such that the optical property of the second blue beam is easy to be adjusted to satisfy different optical applications.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, adapted to provide an illumination beam, the light source module comprising:
   a blue laser light source, adapted to provide a first blue beam;
   an adjusting light source, adapted to provide an adjusting beam;
   a wavelength conversion device, disposed on an optical path of the first blue beam and an optical path of the adjusting beam, having at least one wavelength conversion area and at least one first transmissive area, wherein the at least one wavelength conversion area and the at least one first transmissive area are cut into the optical path of the first blue beam by turns, and the at least one wavelength conversion area is adapted to convert the first blue beam to generate a conversion beam, wherein when the at least one first transmissive area is cut into the optical path of the first blue beam, the blue laser light source and the adjusting light source are simultaneously turned on, the first blue beam and the adjusting beam pass through the at least one first transmissive area, and a transmission direction of the first blue beam passing through the at least one first transmissive area is opposite to a transmission direction of the adjusting beam passing through the at least one first transmissive area; and a light combiner, disposed on the optical path of the first blue beam and the optical path of the adjusting beam, and adapted to combine the first blue beam coming from the at least one first transmissive area and the adjusting beam coming from the at least one first transmissive area into a second blue beam.

2. The light source module as claimed in claim 1, wherein the at least one first transmissive area comprises a light diffusion layer, and the light diffusion layer is adapted to cut into the optical path of the first blue beam.

3. The light source module as claimed in claim 1, wherein a coordinate point of a color chroma of the adjusting beam is located in a closed area defined by a boundary curved line of a CIE 1931 color space and an extension line formed by connecting a coordinate point of a color chroma of the first blue beam and a coordinate point of a color chroma of the second blue beam, and a Y-axis value of the coordinate point of the color chroma of the adjusting beam in the CIE 1931 color space is greater than a Y-axis value of the coordinate point of the color chroma of the second blue beam in the CIE 1931 color space.

4. The light source module as claimed in claim 1, wherein an X-axis value of a coordinate point of a color chroma of the adjusting beam in a CIE 1931 color space is smaller than 0.15, and a Y-axis value of the coordinate point of a color chroma of the adjusting beam in the CIE 1931 color space is greater than 0.06.

5. The light source module as claimed in claim 1, wherein the light combiner is disposed on an optical path of the conversion beam, and is adapted to combine the conversion beam and the second blue beam.

6. The light source module as claimed in claim 1, further comprising:
a filter device, disposed on an optical path of the illumination beam, and having at least one filter area and at least one second transmissive area, wherein the at least one filter area and the at least one second transmissive area are cut into the optical path of the illumination beam by turns, the at least one filter area corresponds to the at least one wavelength conversion area, and the at least one second transmissive area corresponds to the at least one first transmissive area, wherein the at least one second transmissive area is pervious to the second blue beam.

7. The light source module as claimed in claim 1, further comprising:
a wavelength selection element, disposed between the adjusting light source and the wavelength conversion device, and located on the optical path of the first blue beam, and the wavelength selection element being pervious to the adjusting beam and adapted to reflect the first blue beam, wherein when the at least one first transmissive area is cut into the optical path of the first blue beam, the adjusting beam sequentially passes through the wavelength selection element and the at least one first transmissive area.

8. The light source module as claimed in claim 1, further comprising:
a wavelength selection element, disposed on the optical path of the first blue beam, and the wavelength selection element being pervious to the first blue beam and adapted to reflect the adjusting beam, wherein when the at least one first transmissive area is cut into the optical path of the first blue beam, the adjusting beam is reflected by the wavelength selection element to pass through the at least one first transmissive area.

9. The light source module as claimed in claim 1, wherein the optical path of the first blue beam and the optical path of the adjusting beam have an overlapped section, and within the overlapped section, the transmission direction of the first blue beam is opposite to the transmission direction of the adjusting beam.

10. A projection apparatus, comprising:
a light source module, adapted to provide an illumination beam, and the light source module comprising:
a blue laser light source, adapted to provide a first blue beam;
an adjusting light source, adapted to provide an adjusting beam;
a wavelength conversion device, disposed on an optical path of the first blue beam and an optical path of the adjusting beam, having at least one wavelength conversion area and at least one first transmissive area, wherein the at least one wavelength conversion area and the at least one first transmissive area are cut into the optical path of the first blue beam by turns, and the at least one wavelength conversion area is adapted to convert the first blue beam to generate a conversion beam, wherein when the at least one first transmissive area is cut into the optical path of the first blue beam, the blue laser light source and the adjusting light source are simultaneously turned on, the first blue beam and the adjusting beam pass through the at least one first transmissive area, and a transmission direction of the first blue beam passing through the at least one first transmissive area is opposite to a transmission direction of the adjusting beam passing through the at least one first transmissive area; and
a light combiner, disposed on the optical path of the first blue beam and the optical path of the adjusting beam, and adapted to combine the first blue beam coming from the at least one first transmissive area and the adjusting beam coming from the at least one first transmissive area into a second blue beam;
an imaging device, disposed on an optical path of the illumination beam, and adapted to convert the illumination beam into an image beam; and
a projection lens, disposed on an optical path of the image beam, and adapted to project the image beam to a projection target.

11. The projection apparatus as claimed in claim 10, wherein the at least one first transmissive area comprises a light diffusion layer, and the light diffusion layer is adapted to cut into the optical path of the first blue beam.

12. The projection apparatus as claimed in claim 10, wherein a coordinate point of a color chroma of the adjusting beam is located in a closed area defined by a boundary curved line of a CIE 1931 color space and an extension line formed by connecting a coordinate point of a color chroma of the first blue beam and a coordinate point of a color chroma of the second blue beam, and a Y-axis value of the coordinate point of the color chroma of the adjusting beam in the CIE 1931 color space is greater than a Y-axis value of the color chroma of the coordinate point of the second blue beam in the CIE 1931 color space.

13. The projection apparatus as claimed in claim 10, wherein an X-axis value of a coordinate point of a color chroma of the adjusting beam in a CIE 1931 color space is smaller than 0.15, and a Y-axis value of the coordinate point of a color chroma of the adjusting beam in the CIE 1931 color space is greater than 0.06.

14. The projection apparatus as claimed in claim 10, wherein the light combiner is disposed on an optical path of the conversion beam, and is adapted to combine the conversion beam and the second blue beam.

15. The projection apparatus as claimed in claim 10, wherein the light source module further comprises a filter device disposed on an optical path of the illumination beam and having at least one filter area and at least one second transmissive area, wherein the at least one filter area and the at least one second transmissive area are cut into the optical path of the illumination beam by turns, the at least one filter area corresponds to the at least one wavelength conversion area, and the at least one second transmissive area corresponds to the at least one first transmissive area, wherein the at least one second transmissive area is pervious to the second blue beam.

16. The projection apparatus as claimed in claim 10, wherein the light source module further comprises a wavelength selection element disposed between the adjusting light source and the wavelength conversion device and located on the optical path of the first blue beam, the wavelength selection element is pervious to the adjusting beam and is adapted to reflect the first blue beam, wherein when the at least one first transmissive area is cut into the optical path of the first blue beam, the adjusting beam sequentially passes through the wavelength selection element and the at least one first transmissive area.

17. The projection apparatus as claimed in claim 10, wherein the light source module further comprises a wavelength selection element disposed on the optical path of the first blue beam, and the wavelength selection element is pervious to the first blue beam and is adapted to reflect the adjusting beam, wherein when the at least one first transmissive area is cut into the optical path of the first blue beam, the adjusting beam is reflected by the wavelength selection element to pass through the at least one first transmissive area.

18. The projection apparatus as claimed in claim 10, wherein the optical path of the first blue beam and the optical path of the adjusting beam have an overlapped section, and within the overlapped section, the transmission direction of the first blue beam is opposite to the transmission direction of the adjusting beam.

* * * * *